| United States Patent [19] | [11] 4,111,466 |
|---|---|
| Deregibus | [45] Sep. 5, 1978 |

[54] COLLAPSIBLE TANKER HOSE COUPLING

[76] Inventor: Alfio D. A. Deregibus, Via Livorno, 5 Padova, Italy

[21] Appl. No.: 765,768

[22] Filed: Feb. 4, 1977

[30] Foreign Application Priority Data

Feb. 2, 1976 [IT] Italy ............................ 41512 A/76

[51] Int. Cl.² ............................................ F16L 47/00
[52] U.S. Cl. ................................. 285/133 R; 285/138; 285/239; 285/336
[58] Field of Search ................... 285/133 R, 138, 336, 285/239

[56] References Cited

U.S. PATENT DOCUMENTS

| 724,675 | 4/1903 | Decker | 285/133 R |
|---|---|---|---|
| 1,736,923 | 11/1929 | Lalonde | 285/133 R |
| 2,325,464 | 7/1943 | Bannister | 285/133 X |
| 2,860,311 | 11/1958 | Balian | 285/133 X |
| 3,980,112 | 9/1976 | Basham | 285/133 X |

*Primary Examiner*—Wayne L. Shedd
*Attorney, Agent, or Firm*—Bacon & Thomas

[57] ABSTRACT

A pair of concentric hoses of flexible elastomeric material are spaced radially apart to define an annular space around the inner hose. Both hoses are secured at each of their ends to a common connector ring for securing successive lengths of the double hose together. Passages through the connector rings provide communication between the annular spaces.

3 Claims, 2 Drawing Figures

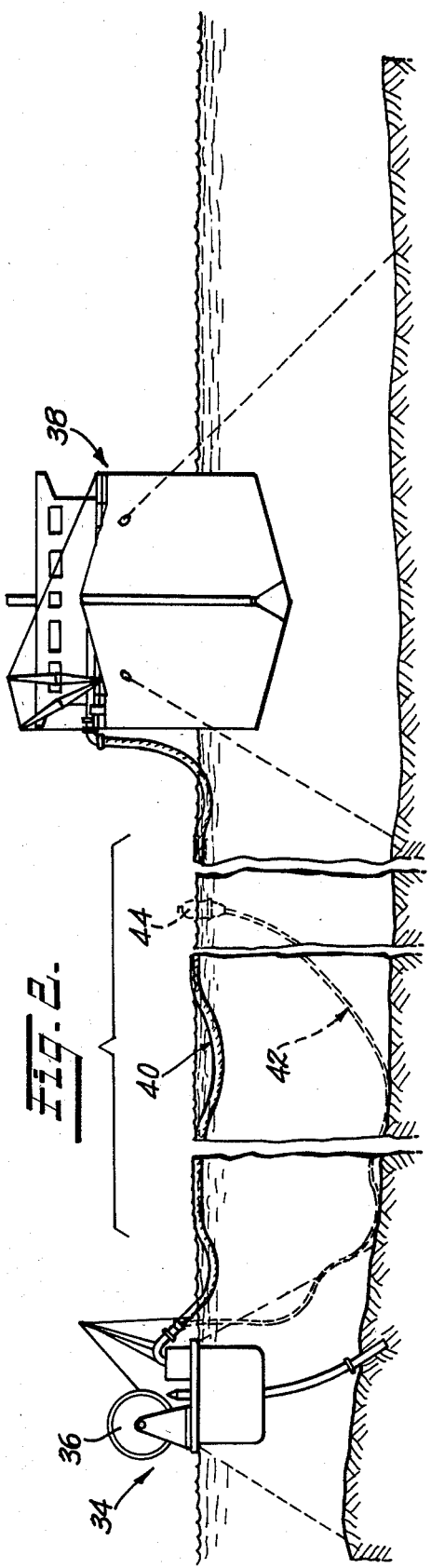

COLLAPSIBLE TANKER HOSE COUPLING

BACKGROUND OF THE INVENTION

This invention is in the field of flexible hoses and particularly hose assemblies for conducting petroleum products to or from a tanker.

Tankers carrying liquid petroleum products are conventionally loaded or unloaded near a land based station or the like and many problems are encountered. Usually a hose or pipe extends from the tanker to the land based station and often a hose is employed that is arranged to float at the surface of the sea. Such hoses are conventionally short lengths, only semi flexible, connected together and provided with a special outer surface of low specific weight or an additional adjacent tubing that is inflated, for the purpose of providing buoyancy. Many problems arise with such conventional systems. Water pollution often results from accidental rupture of such hoses. The conventional hoses are generally too stiff to be coiled and so must be in relatively short lengths, which presents transporting problems and necessitates many more connections between hose sections and more likelihood of leaks. The floating hose constitutes an obstruction of the seaway across which the hoses are floating. The high cost of changing defective hose sections and relatively long waiting periods are incompatible with the high cost per hour of a tanker that is stopped for loading or unloading.

SUMMARY OF THE INVENTION

The present invention comprises generally two long concentric elastomeric hoses that can be joined end to end to a similar double hose to define a central conduit for the product and an annular outer chamber capable of inflation or collapse.

BRIEF DESCRIPTION OF THE DRAWINGS

FIG. 2 is a schematic view illustrating a manner of use of the present invention.

DESCRIPTION OF THE PREFERRED EMBODIMENT

Figure 1:
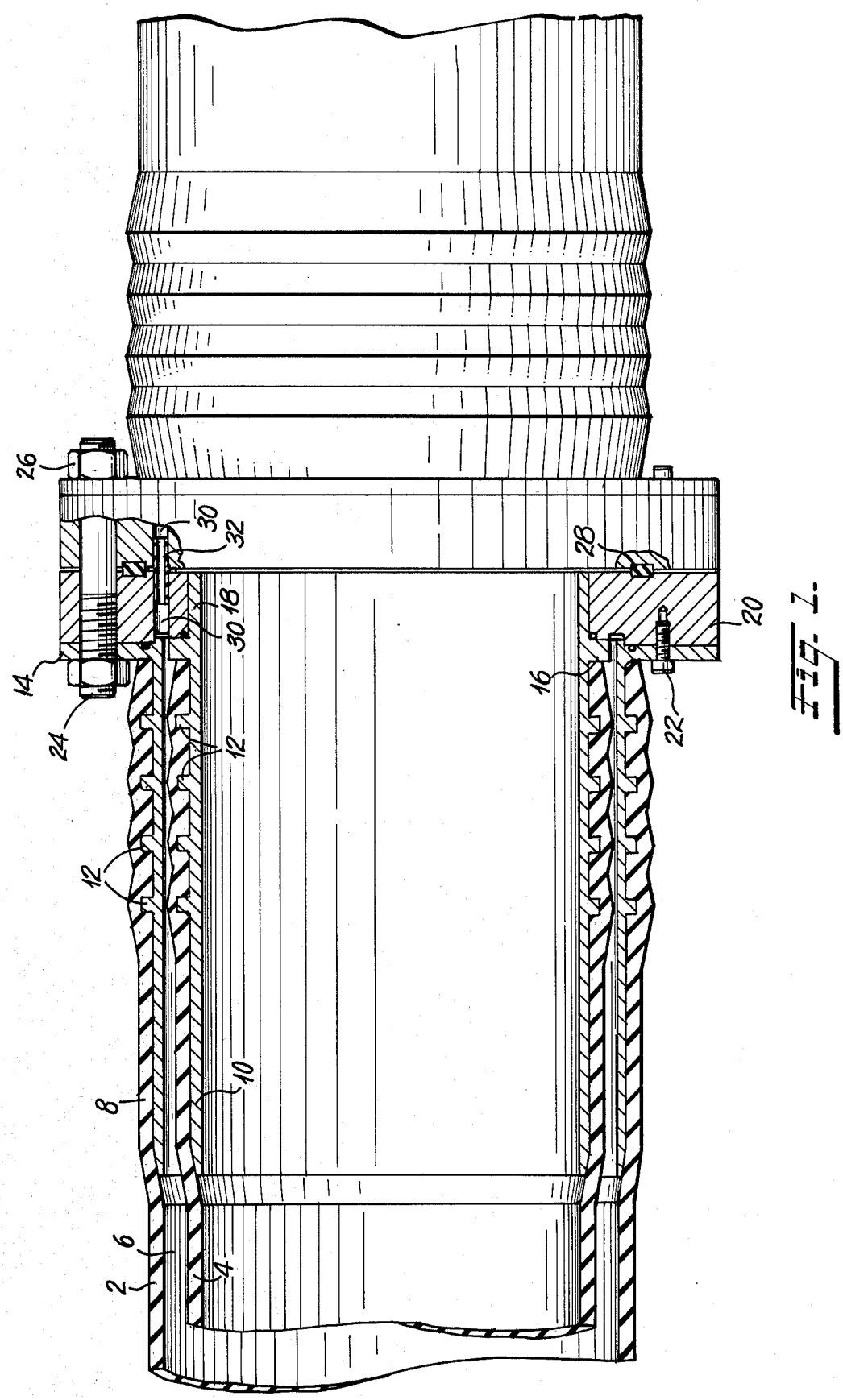
FIG. 1 is a view of adjacent hose sections, partially shown in axial section.

Referring first to FIG. 1, the conduit of the present invention comprises a pair of concentrically arranged elastomeric tubes or hoses 2 and 4. As shown, they are arranged in somewhat radially spaced relation, defining an annular space 6 therebetween. Each of the hoses 2 and 4 is provided with a tubular metallic end fitting 8 or 10 having protrusions or ribs 12 for secure engagement with the respective hoses. The fitting 8 has a radial flange 14 at one end whereas the fitting 10 is provided with a short flange 16 inwardly from its outer end and has a projecting tubular portion 18. An annular connector ring 20 is secured to the flange 14 by bolts 22 and the portion 18 of the fitting 10 is telescopically and tightly fitted to the inner periphery of the connector ring 20.

It is contemplated that similar connections be provided at both ends of the double hose arrangement just described. In setting the apparatus for use, hose sections are connected together by bolting their flanges 20 in face-to-face relation by means of bolts 24 and nuts 26. Preferably suitable seals such as the annular ring 28 are provided between the connector rings.

As also shown in FIG. 1, each of the connector rings 20 is provided with at least one axial passage 30 therethrough communicating with the annular space 6, which passages are in alignment when hose sections are connected together. A suitable sealing tubular member 32 is placed in the aligned passages 30 to span the interface between the rings 20 and thereby effect an airtight seal.

Referring now to FIG. 2, numeral 34 indicates generally a pumping or hose storage station which may have a reeling drum 36 on which the hose may be coiled when not in use. Numeral 38 indicates a tanker in position to be loaded or unloaded and 40 indicates a length of the tubular hose, previously described, extending from the station 34 to tanker 38. In use, air or other inert gas may be pumped into the annular space 6, by suitable means and connections not shown. This provides sufficient buoyancy to hold the pipe floating on or near the surface of the water and at which time petroleum products may be pumped or drawn through the inner hose 4 as is well understood. During periods of non-use, the hose may be collapsed to sink to the bottom of the waterway, as indicated by broken lines 42 in FIG. 2 or wound on drum 36.

When the supply of product being pumped is exhausted, liquid products still remain in the inner hose 4. At such times the air pressure in annular space 6 may be increased sufficiently to collapse the inner hose 4 inwardly to thus expel the liquid products in that hose. With the inner hose collapsed, the air pressure in the annular space 6 may be withdrawn and, if necessary, a partial vacuum drawn in that space to cause the entire hose to collapse to a substantially flat condition. In this condition the hose may be easily wound on drum 36 if desired. The material of the hoses is of greater specific density than the water and thus when in collapsed or partially collapsed condition, the hose is heavier than water and will sink to the bottom of the body of water. Before the hose is caused to sink, however, its end is disconnected from the tanker 38 and a suitable floating buoy or marker 44 is attached to the end of the hose whereby it may be readily retrieved for further use. As is clearly evident, when the hose has been collapsed and sunk, as shown at 42, the seaway or boat lanes thereover are open for the usual or necessary marine traffic.

It is to be noted that the pressure of air in space 6 balances the pumping pressure in hose 4 thus relieving hose 4 of stresses and prolonging its life with less likelihood of rupture. This also permits using higher pumping pressures and thereby speed. In the event the inner hose 4 should rupture or leak the oil would be trapped in space 6 and thus prevent pollution of the surrounding water. It is also proposed that in the event of rupture of the outer hose 2, suitable controls (not shown), responsive to loss of air pressure, may be effective to stop the pumping operation.

While a single specific embodiment of the invention has been shown and described, the same is merely illustrative of the principles involved and other forms may be resorted to within the scope of the appended claims.

I claim:

1. A flexible hose structure for loading and unloading petroleum products from tankers, comprising:
    an inner elastomeric and flexible tubular hose;
    an outer elastomeric and flexible tubular hose concentrically surrounding said inner hose and spaced outwardly therefrom to provide a space therebetween;

a connector ring sealingly secured at an end of both said hoses and having means for securing said ring to a similar ring on adjacent concentric hoses;

a separate tubular metallic fitting secured to said end of each hose, said fittings being secured to said connector ring in concentric but radially spaced relation, said connector ring being provided with at least one axially extending passage therethrough between said tubular metallic fittings and communicating with said space between said hoses.

2. A hose structure as defined in claim 1 wherein said connector ring is sealingly secured to a similar connector ring on adjacent concentric hoses with the axial passages of both connector rings in alignment; and a tubular sealing member extending into both aligned passages, across the interface between said connector rings.

3. A hose structure as defined in claim 1 wherein the specific weight of the elastomeric material of said hoses is greater than that of water.

* * * * *